(12) United States Patent
Mesnil

(10) Patent No.: US 11,313,837 B2
(45) Date of Patent: Apr. 26, 2022

(54) DEVICE, SYSTEM AND METHOD FOR IMAGING DEFECTS IN A STRUCTURE BY TRANSMITTING AND RECEIVING MECHANICAL WAVES IN THIS STRUCTURE

(71) Applicants: COMMISSARIAT À L'ÉNERGIE ATOMIQUE ET AUX ÉNERGIES ALTERNATIVES, Paris (FR); SAFRAN, Paris (FR)

(72) Inventor: Olivier Mesnil, Orsay (FR)

(73) Assignees: COMMISSARIAT A L'ENERGIE ATOMIQUE ET AUX ENERGIES ALTERNATIVES, Paris (FR); SAFRAN, Paris (FR)

( * ) Notice: Subject to any disclaimer, the term of this patent is extended or adjusted under 35 U.S.C. 154(b) by 156 days.

(21) Appl. No.: 16/954,034

(22) PCT Filed: Dec. 13, 2018

(86) PCT No.: PCT/FR2018/053287
§ 371 (c)(1),
(2) Date: Jun. 15, 2020

(87) PCT Pub. No.: WO2019/115971
PCT Pub. Date: Jun. 20, 2019

(65) Prior Publication Data
US 2021/0080430 A1   Mar. 18, 2021

(30) Foreign Application Priority Data

Dec. 14, 2017 (FR) .................................. 1762166

(51) Int. Cl.
*G01N 29/04* (2006.01)
*G01N 29/06* (2006.01)
(Continued)

(52) U.S. Cl.
CPC ....... *G01N 29/041* (2013.01); *G01N 29/0681* (2013.01); *G01N 29/2412* (2013.01);
(Continued)

(58) Field of Classification Search
CPC ............ G01N 29/041; G01N 29/0681; G01N 29/2418; G01N 29/2437; G01N 29/4436;
(Continued)

(56) References Cited

FOREIGN PATENT DOCUMENTS

CN   107037131 A   8/2017
FR   3 014 200 A1   6/2015

OTHER PUBLICATIONS

Li, et al., "Combination of nonlinear ultrasonics and guided wave tomography for imaging the micro-defects", Ultrasonics, Elsevier, vol. 65, pp. 87-95, (2016).
(Continued)

*Primary Examiner* — Tarun Sinha
(74) *Attorney, Agent, or Firm* — BakerHostetler

(57) ABSTRACT

A device for imaging defects in a structure includes N transmitters and P receivers to be distributed over at least one surface of the structure and a central unit controlling the transmitters and receivers to sequentially record $Q \leq N \times P$ signals (S) obtained from electrical signals provided by the receivers of Q different transmitter/receiver pairs, after reception of mechanical waves transmitted by the transmitters of these Q pairs. It further stores Q first and Q second corresponding reference signals ($S_{REF1}$, $S_{REF2}$), representative of the structure without defects and differing by random noise. A central processing unit is programmed to: correlate each signal obtained with the corresponding first reference
(Continued)

signal, in such a way as to construct an image of probabilities of defects; correlate each first reference signal with the corresponding second reference signal, in such a way as to construct a reference noisy image; and subtract the reference noisy image from the image of probabilities of defects.

10 Claims, 2 Drawing Sheets

(51) Int. Cl.
    *G01N 29/24*      (2006.01)
    *G01N 29/44*      (2006.01)

(52) U.S. Cl.
    CPC ..... *G01N 29/2418* (2013.01); *G01N 29/2437* (2013.01); *G01N 29/4436* (2013.01); *G01N 2291/0231* (2013.01); *G01N 2291/0289* (2013.01); *G01N 2291/105* (2013.01)

(58) Field of Classification Search
    CPC ............. G01N 29/0672; G01N 29/069; G01N 2291/0231; G01N 2291/0289; G01N 2291/105
    See application file for complete search history.

(56) References Cited

OTHER PUBLICATIONS

Zhao, et al., "Active health monitoring of an aircraft wing with embedded piezoelectric sensor/actuator network: I. Defect detection, localization and growth monitoring", Smart Materials and Structures, IOP Publishing, vol. 16, No. 4, pp. 1208-1217, Aug. 1, 2007.

Sakai, et al., "Defect detection method using statistical image processing of scanning acoustic tomography", 2016 IEEE 23rd International Symposium on the Physical and Failure Analysis of Integrated Circuits (IPFA), pp. 293-296, Jul. 18, 2016.

DEVICE, SYSTEM AND METHOD FOR IMAGING DEFECTS IN A STRUCTURE BY TRANSMITTING AND RECEIVING MECHANICAL WAVES IN THIS STRUCTURE

CROSS-REFERENCE TO RELATED APPLICATIONS

This application is a National Stage of International patent application PCT/FR2018/053287, filed on Dec. 13, 2018, which claims priority to foreign French patent application No. FR 1762166, filed on Dec. 14, 2017, the disclosures of which are incorporated by reference in their entirety.

FIELD OF THE INVENTION

The present invention relates to a device for imaging defects in a structure by transmitting and receiving mechanical waves in this structure. It also relates to an imaging method implemented by such a device and a system including such a device.

It applies in particular, but not exclusively, to the fields of nondestructive testing and structural health monitoring of thin structures by guided elastic waves. In these uses, the elastic mechanical waves measured can, optionally compared to a reference state, provide information on a state of the structure and identify, locate and sometimes quantity defects of the type hole, delamination, crack, corrosion, etc.

BACKGROUND

A large number of different algorithms, based on captures of mechanical waves sequentially transmitted in the structure for example using piezoelectric transducers, can be implemented by such an imaging device. Certain algorithms provide very precise results but generally require an a priori knowledge of the geometry of the structure, or at least of the characteristics of the propagation of the waves in the structure that come from its mechanical properties. They thus pose a problem for the imaging of complex or poorly known structures like those that can be found in the field of aeronautics. There are also simple algorithms not requiring a priori knowledge of the geometry of the structure and of its mechanical properties, but the results obtained are generally not as good.

The invention applies more particularly to an imaging device implementing a simple algorithm and including:
  a plurality of N transmitters of mechanical waves intended to propagate in the structure, to be distributed over at least one surface of the structure,
  a plurality of P receivers of mechanical waves after their propagation in the structure, to be distributed over said at least one surface of the structure,
  a central unit for controlling the N transmitters and P receivers programmed to record $Q \leq N \times P$ signals obtained from electrical signals respectively provided by the receivers of Q different transmitter/receiver pairs of the plurality of transmitters and receivers, after reception of mechanical waves transmitted by the transmitters of said Q different pairs,
  means for storing Q corresponding first reference signals, representative of the structure without defects, and
  a central unit for processing the Q signals obtained, programmed to correlate each signal obtained with the first reference signal that corresponds to it, in such a way as to obtain Q first values of correlations, and to construct an image of probabilities of defects in the structure from the Q first values of correlations.

Such a device is for example described in the article by Zhao et al., entitled "Active health monitoring of an aircraft wing with embedded piezoelectric sensor/actuator network: I. Defect detection, localization and growth monitoring", published in Smart Materials and Structures, IOP Publishing, volume 16, pages 1208-1217 (2007). It implements an algorithmic method called RAPID (from "Reconstruction Algorithm for Probabilistic Inspection of Defects") according to which each correlation value associated with a pair consisting of one of the transmitters and of one of the receivers is used to construct an intermediate image of probable location of one or more defects in a predetermined elliptical zone around the transmitter and the receiver in question. This zone is defined by an ellipse, the foci of which are for example the transmitter and the receiver of the pair in question. The probability is inversely proportional to the correlation value calculated and decreases towards 0 when moving away from the transmitter-receiver segment towards the ellipse. The complete image of probabilities of defects in the structure is thus constructed by summing the Q intermediate images.

It is clear that such a device proposes a particularly simple imaging solution independent of the geometry, even complex, and of the material of the structure inspected. The calculation time is negligible. However, via the use of the values of correlations using an elliptical model applied around each transmitter and receiver pair, it introduces a bias clearly visible in FIG. 11 of the aforementioned article by Zhao et al. This bias is strongly dependent on the positioning of the transmitters and receivers on the structure inspected and a filtering, difficult to parameter or to reproduce systematically, is indispensable. The result is thus approximative and not very reliable. In particular, the risk of detecting nonexistent defects (generally called "false alarm") is significant: for example, when the transmitters and receivers are disposed in a circle around a zone to be imaged, the probability of detecting a false defect at the center of the circle, where numerous segments formed by the various possible transmitter/receiver pairs intersect, is high.

The article by Li et al., entitled "Combination of nonlinear ultrasonics and guided wave tomography for imaging the micro-defects", published in Ultrasonics, Elsevier, volume 65, pages 87-95 (2016), proposes an improvement of the RAPID algorithm. This involves optimizing the determination of the parameter of decrease of the values of correlations in the elliptical zones considered. But this does not solve the problem of the bias and of the false alarms that result therefrom.

It may thus be desired to provide an imaging device that allows to overcome at least a part of the aforementioned problems and constraints.

SUMMARY OF THE INVENTION

A device for imaging defects in a structure by transmitting and receiving mechanical waves in this structure is thus proposed, including:
  a plurality of N transmitters of mechanical waves intended to propagate in the structure, to be distributed over at least one surface of the structure,
  a plurality of P receivers of mechanical waves after their propagation in the structure, to be distributed over said at least one surface of the structure,
  a central unit for controlling the N transmitters and P receivers programmed to record $Q \leq N \times P$ signals obtained from electrical signals respectively provided by the receivers of Q different transmitter/receiver pairs of the plurality of transmitters and receivers, after reception of mechanical waves transmitted by the transmitters of said Q different pairs, means for storing Q corresponding first reference signals, representative of the structure without defects, a central unit for processing the Q signals obtained, programmed to correlate each signal obtained with the first reference signal that corresponds to it, in such a way as to obtain Q first values of correlations, and to construct an image of probabilities of defects in the structure from the Q first values of correlations, further including means for storing Q corresponding second reference signals, also representative of the structure without defects but differing from the Q first reference signals by random noise, the central unit for processing the Q signals obtained further being programmed to:

correlate each first reference signal with the second reference signal that corresponds to it, in such a way as to obtain Q second values of correlations, construct a reference noisy image from the Q second values of correlations, and subtract the reference noisy image from the image of probabilities of defects.

Thus, the reference noisy image repeats the bias introduced by the use of the Q second values of correlations calculated, regardless of the model used to use these values, and it happens that this bias is substantially the same as that introduced by the use of the Q first values of correlations. It has further been observed that this bias is finally not very dependent on the manner in which the first and second reference signals representative of the structure without defects are obtained, by measurements or by addition of simulated noise.

Optionally, at least a part of the N transmitters is part of the P receivers.

Also optionally, each of the N transmitters and of the P receivers is an actuator or a sensor chosen from the set consisting of:

a piezoelectric transducer,
an electromagnetic acoustic transducer,
a microelectromechanical or nanoelectromechanical transducer,
a fiber-optic sensor, and
a laser sensor.

Also optionally, each of the N transmitters and of the P receivers is capable of transmitting or receiving guided waves in the structure, in particular Lamb or Rayleigh waves.

In particular, when piezoelectric transducers are used, they can all be advantageously used both as transmitters and as receivers. Moreover, if one (for example the thickness) of the characteristic dimensions of the structure inspected is much smaller than its two other characteristic dimensions (i.e. the length and the width), it is guided ultrasonic Lamb waves that propagate in the structure. If the three aforementioned characteristic dimensions of the structure are of the same order of magnitude, it is guided ultrasonic Rayleigh waves that propagate at the surface of the structure.

Also optionally, the Q second reference signals differ from the Q first reference signals by random noise, simulated or measured, the standard deviation of which is between that of a noise measurable in the Q first reference signals and that of a useful pulse or harmonic signal also measurable in the Q first reference signals, preferably closer to that of the measurable noise than to that of the measurable useful pulse signal.

Also optionally, $Q=N \times P$, or $N=P$ and $Q=N \times (N-1)$. In this case, all the different possible transmitter/receiver pairs are used.

Also optionally, the construction of the image of probabilities of defects and the construction of the reference noisy image each include the construction of Q intermediate images, each intermediate image corresponding to one of the Q different transmitter/receiver pairs and taking into account the corresponding first or second correlation value in a predetermined zone, in particular an elliptical zone, defined around the segment formed between the transmitter and the receiver of this pair.

A system for imaging defects in a structure by transmitting and receiving mechanical waves in this structure is also proposed, including:

the structure in which a zone to be imaged is located,
an imaging device according to the invention, wherein the N transmitters and P receivers are disposed circularly around the zone to be imaged for a construction of the image of probabilities of defects corresponding to this zone.

A system for imaging defects in a structure by transmitting and receiving mechanical waves in this structure is also proposed, including:

the structure in which a zone to be imaged is located,
an imaging device according to the invention, wherein the N transmitters and P receivers are distributed inside the zone to be imaged for a construction of the image of probabilities of defects corresponding to this zone.

A method for imaging defects in a structure by transmitting and receiving mechanical waves in this structure is also proposed, including the following steps:

distributing, over at least one surface of the structure, a plurality of N transmitters of mechanical waves intended to propagate in the structure, distributing, over said at least one surface of the structure, a plurality of P receivers of mechanical waves after their propagation in the structure, controlling the N transmitters and P receivers to sequentially transmit and receive mechanical waves by the transmitters and receivers of $Q \leq N \times P$ different transmitter/receiver pairs of the plurality of transmitters and receivers, recording Q signals obtained from electrical signals respectively provided by the receivers of the Q different pairs, after reception of said mechanical waves, processing the Q signals obtained by respectively correlating them with Q corresponding first reference signals, representative of the structure without defects, in such a way as to obtain Q first values of correlations, constructing an image of probabilities of defects in the structure from the Q first values of correlations, further including the following steps:

respectively correlating the Q first reference signals with Q corresponding second reference signals, also representative of the structure without defects but differing from the Q first reference signals by random noise, in such a way as to obtain Q second values of correlations, constructing a reference noisy image from the Q second values of correlations, and subtracting the reference noisy image from the image of probabilities of defects.

BRIEF DESCRIPTION OF THE DRAWINGS

The invention will be better understood via the following description, given only as an example and made in reference to the appended drawings in which.

DETAILED DESCRIPTION

Figure 1:
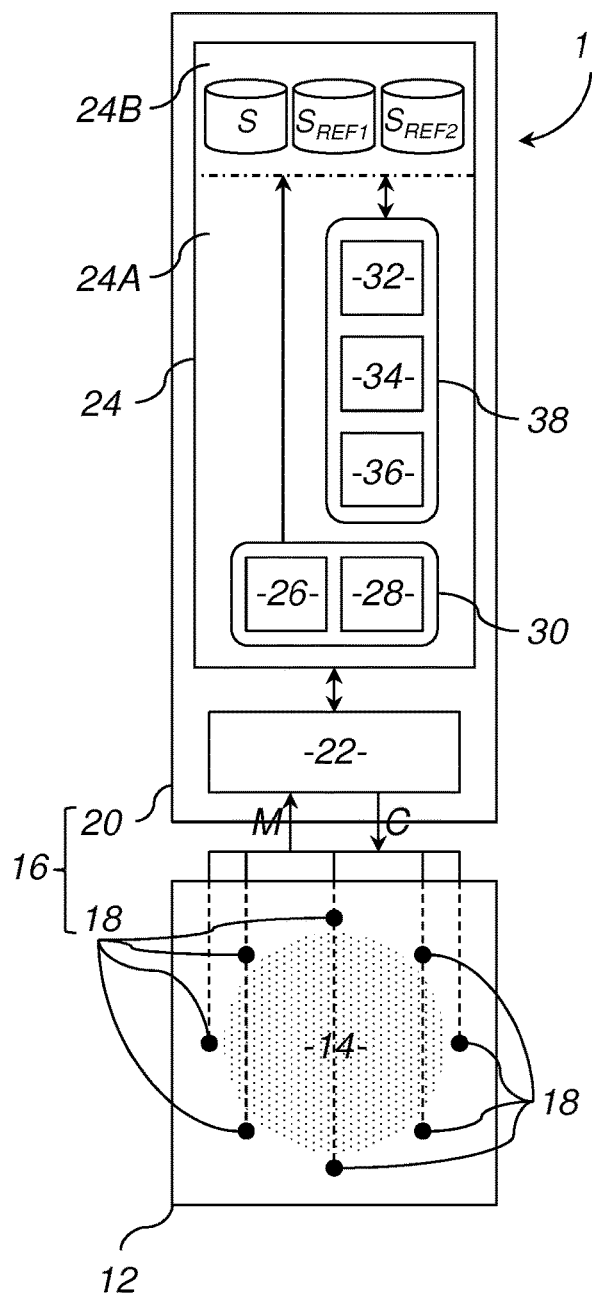
FIG. 1 schematically shows the general structure of a system for imaging defects in a structure, according to a first embodiment of the invention, FIG. 2 schematically shows the general structure of a system for imaging defects in a structure, according to a second embodiment of the invention.

The system 10 illustrated in FIG. 1 includes a structure 12 having a circular zone 14 to be imaged shown by shading. The structure 12 is for example a thin structure of an aeronautical part. But it could also be any part from the aerospace, motor vehicle, oil field, or more generally from any industrial field in which questions are asked about the structural state of manufactured parts, in particular thin parts, that is to say the lateral dimensions of which are very large (i.e. at least greater than 10 times) with respect to the thickness.

The system 10 further includes an imaging device 16 capable of detecting and locating one or more defects in the structure 12 by transmitting and receiving mechanical waves. For this purpose, the imaging device 16 includes a plurality of transducers 18 capable of transmitting mechanical waves intended to propagate in the structure 12 and an electronic control and processing circuit 20. In the specific example of FIG. 1, the transmitting transducers 18 are shown by black dots. They are N=8 in number and distributed in a circle around the circular zone 14 to be imaged, and this distribution can be regular without this being an obligation. They further carry out a function of receiving mechanical waves after their propagation in the structure 12. Also in this example, they are electrically connected to the electronic circuit 20 which controls their transmissions of mechanical waves and processes the electrical signals that they provide upon reception of mechanical waves. But more generally, the transmitters of waves are not necessarily receivers and vice versa. Moreover, the number N of transmitters is not necessarily the same as the number P of receivers. However, at least a part of the N transmitters can be part of the P receivers. Also alternatively, it is possible to move the control electronics to each transducer. In this case, the electrical link between the electronic circuit 20 and the transducers 18 is no longer necessary, and the transmission of the signals provided by the receivers can be carried out by telecommunication, in particular by wireless telecommunication (for example using a wireless protocol of the Wi-Fi type).

In a manner well known in the devices for imaging by transmitting and receiving mechanical waves, the transducers 18 are advantageously piezoelectric transducers: such transducers carry out at the same time the functions of actuators and sensors and are very cheap. They act in the range of the ultrasound waves that propagate very well, in the materials generally inspected, in the form of Lamb or Rayleigh guided waves. The advantage of Lamb waves is that they examine the entire thickness of the structure, allowing the detection of defects invisible on the surface, but they only easily propagate in thin structures. Rayleigh waves are adapted to thick structures, but they only propagate on the surface, thus only examining a limited depth of the structure. More generally, each of the N transmitters and of the P receivers is an actuator or sensor that can be chosen from a piezoelectric transducer, an EMAT (from "Electro-Magnetic Acoustic Transducer") electromagnetic acoustic transducer, a MEMS (from "MicroElectroMechanical Systems") microelectromechanical or NEMS (from "NanoElectroMechanical Systems") nanoelectromechanical transducer, a fiber-optic sensor, a laser sensor, or other.

Moreover, the positioning of the transducers 18 of FIG. 1 in a circle around the circular zone 14 to be imaged is generally qualified as a "tomography configuration", by analogy with the tomographic imaging according to which the transmitters and receivers are also disposed in a circle. This configuration, generally costly in terms of transducers because it requires concretely a large number of them, allows to obtain rather precise information on the health of the structure in the zone surrounded by the transducers.

As indicated above, in the non-limiting example of FIG. 1, the electronic circuit 20 is connected to the transducers 18 in order to transmit to them control signals C for the transmission of ultrasound pulses and in order to receive measurement signals M in response to the transmission of these pulses. The electronic circuit 20 is for example that of a computer. It has a central processing unit 22, such as a microprocessor designed to transmit towards the transducers 18 the control signals C, to receive from the transducers 18 the measurement signals M and to process the latter, as well as a memory 24, for example a RAM memory, in which computer program instructions and processing data are recorded.

The computer program instructions are illustrated in FIG. 1 as belonging to a first portion 24A of the memory 24 and as defined:

in two computer programs 26 and 28 of a first functional module 30 which, in cooperation with the microprocessor 22, forms a central unit for controlling the transducers 18, and in three computer programs 32, 34, 36 of a second functional module 38 which, in cooperation with the microprocessor 22, forms a central unit for processing the measurement signals M.

The computer program 26 of the central control unit 22, 30 includes instructions defined to sequentially control the transducers 18 in transmission and reception of guided waves in the structure 12. More precisely, a plurality of different transmitter/receiver pairs can be formed from the N=8 transducers 18: at most $N^2=64$ since each transducer 18 can be both a transmitter and receiver. In particular, even if the interest is limited in terms of image quality, it is possible to measure what the transmitter of a wave receives. But in general, and in particular in the aforementioned prior art, at most $N \times (N-1)=56$ pairs are considered because each transmitter is advantageously used in transmission, that is to say that what the transmitter of a wave receives is not measured. Moreover, in theory, a transmitter/receiver pair should give the same results as the reverse pair in which the transmitter becomes a receiver and the receiver becomes a transmitter, but in practice this is never the case because of in particular the noise generated by the measurement. Considering the totality of the $N \times (N-1)=56$ pairs possible using the N=8 transducers 18 is therefore of interest for averaging the results. More generally, for an imaging device 16 with N transmitters and P receivers, $N \times P$ different pairs can be formed at most. Thus, according to the present invention, the computer program 26 includes instructions for successively controlling Q≤N×P (or Q≤N² or Q≤N×(N−1), if N=P, in particular when the transmitters are also the receivers) different transmitter/receiver pairs in transmission and reception. At best, Q=N×P pairs can be formed. In practice, a pulse or harmonic wave with a finite duration is transmitted by the transmitter of each pair when it is actuated by the control unit 22, 30, propagates in the structure 12, then is received by the receiver of the pair actuated.

Q electrical signals are thus sequentially provided by the receivers of the Q different transmitter/receiver pairs formed. They are digitized, then processed by execution of the computer program 28 to be recorded in a second portion 24B of the memory 24 dedicated to the processing data of the computer programs 32, 34, 36. Alternatively, as is generally done in the technical field in question, it is advised to control each transmitter/receiver pair several times in transmission and reception, for example 10 to 1000 times according to the quality of the electrical signals received, to receive a plurality of electrical signals per pair and obtain therefrom a signal to be recorded in the memory 24B by a calculation of an average. This allows to increase the signal-to-noise ratio of the measurement.

In particular, when the structure 12 is healthy, that is to say without defects, Q first reference signals $S_{REF1}$ can be obtained and recorded in the memory 24B using a first sequence of measurements carried out by the control unit 22, 30, with or without repetitions of transmissions and receptions for each transmitter/receiver pair formed. They are representative of the structure 12 without defects. A second sequence of measurements carried out by the control unit 22, 30 in the same conditions can allow the obtaining and the recording of Q second reference signals $S_{REF2}$, also representative of the structure 12 without defects, but differing from the Q first reference signals $S_{REF1}$ by random noise, this random noise being inherent to any sequence of measurements. Alternatively, the Q second reference signals $S_{REF2}$ can also be obtained by addition of simulated random noise to the Q first reference signals $S_{REF1}$.

When it is desired to later know whether the structure 12 remains healthy or whether it has one or more defects, a new sequence of measurements carried out by the control unit 22, 30 allows to obtain and record in the memory 24B Q signals noted as S which are thus to be compared to the reference signals $S_{REF1}$ and/or $S_{REF2}$.

For this purpose, the computer program 32 of the central processing unit 22, 38 includes instructions defined to correlate each of the Q signals S with the first reference signal that corresponds to it in the set of the Q first reference signals $S_{REF1}$, in such a way as to obtain Q first values of correlations $V_1, \ldots, V_Q$. These correlation values are obtained in a manner known per se, for example according to the teaching of the document by Zhao et al. cited above: these are scalar values, advantageously normalized between 0 and 1. A correlation value at 1 indicates a total correlation between one of the signals S and the first reference signal that corresponds to it, that is to say a minimal probability of presence of at least one defect in a vicinity (to be defined) of the segment consisting of the transmitter/receiver pair considered. On the contrary, a correlation value of 0 indicates a null correlation between one of the signals S and the first reference signal that corresponds to it, that is to say a maximal probability of presence of at least one defect in a vicinity (to be defined) of the segment consisting of the transmitter/receiver pair considered. Q first values of probabilities $P_1, \ldots, P_Q$, defined in the following manner: $\forall i$, $1 \leq i \leq Q$, $P_i = 1 - V_i$ can thus be deduced therefrom.

The computer program 34 of the central processing unit 22, 38 includes instructions defined to construct an image $Im_{INIT}$ of probabilities of defects in the structure 12 from the Q first values of correlations $V_1, \ldots, V_Q$. In a simple embodiment as inspired by the teaching of the RAPID algorithmic method of the aforementioned document by Zhao et al., the image $Im_{INIT}$ is more precisely constructed from the Q first values of probabilities $P_1, \ldots, P_Q$. Each first probability value $P_i$ associated with the i-th transmitter/receiver pair formed is used to construct an intermediate image of probable location of at least one defect in a predetermined elliptical zone around the transmitter and the receiver considered. This zone is for example defined by an ellipse, the foci of which are the transmitter and the receiver of the pair considered, or by an ellipse, the major axis of which is the segment formed between the transmitter and the receiver of the pair considered. The values of pixels in each intermediate image are maximal and a function of the corresponding first probability value $P_i$ on the segment consisting of the transmitter and the receiver considered. Then these values of pixels decrease towards 0 when moving away from the transmitter-receiver segment towards the ellipse. The complete image of probabilities of defects $Im_{INIT}$ is then constructed by summing the Q intermediate images. The teaching of the aforementioned document by Li a et al. can also advantageously be used to improve the instructions of the computer program 34.

The instructions of the computer program 32 also allow to correlate each of the Q first reference signals $S_{REF1}$ with the second reference signal that corresponds to it in the set of the Q second reference signals $S_{REF2}$, in such a way as to obtain Q second values of correlations $V'_1, \ldots, V'_Q$ and deduce therefrom Q second values of probabilities $P'_1, \ldots, P'_Q$. Likewise, the instructions of the computer program 34 also allow to construct a reference noisy image $Im_{REF}$ from the Q second values of correlations $V'_1, \ldots, V'_Q$ or, more precisely, from the Q second values of probabilities $P'_1, \ldots, P'_Q$.

Finally, the computer program 36 of the central processing unit 22, 38 includes instructions for constructing a corrected image $Im_{CORR}$ of probabilities of defects by subtracting, from pixel to pixel, the reference noisy image $Im_{REF}$ from the image $Im_{INIT}$ of probabilities of defects: $Im_{CORR} = Im_{INIT} - Im_{REF}$.

Figure 2:
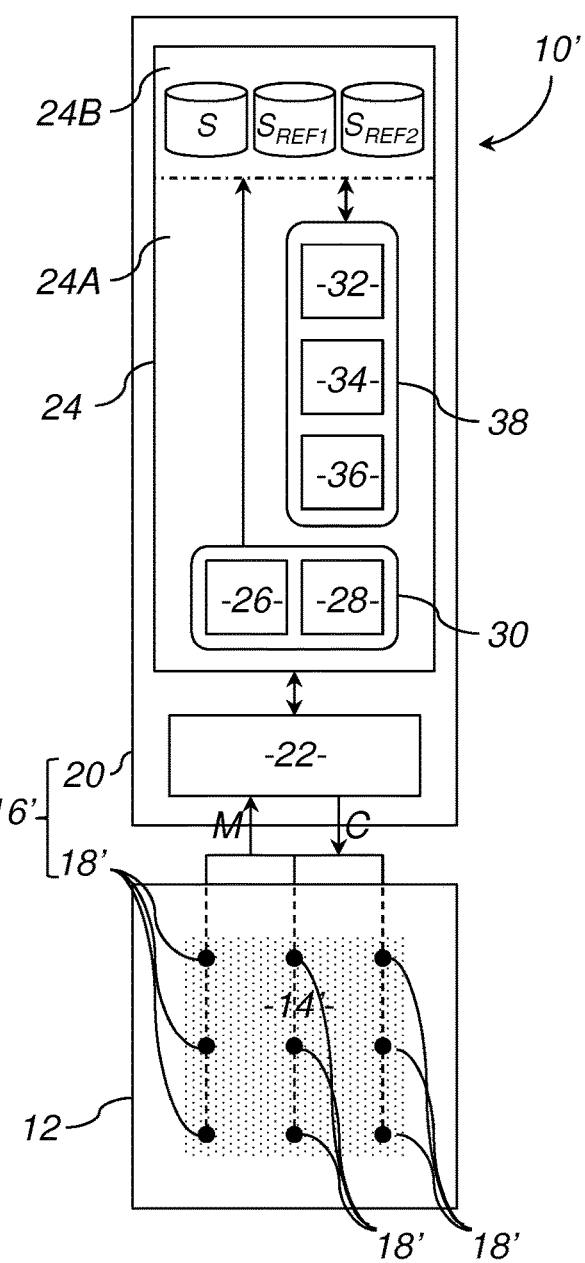
Figure 3:
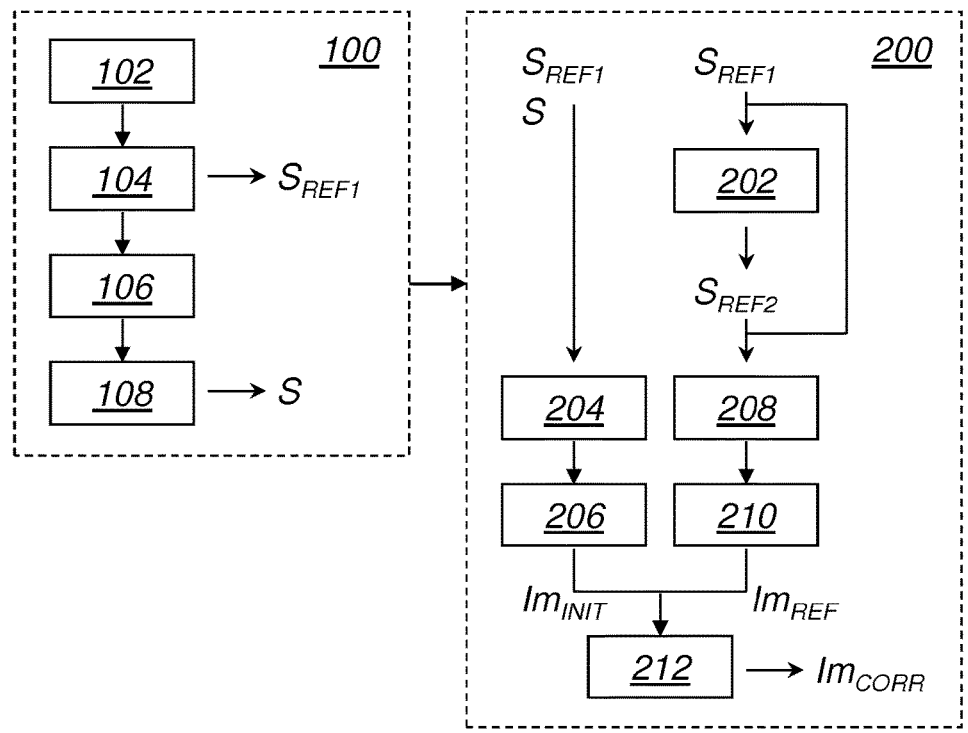
FIG. 3 illustrates the successive steps of an imaging method implemented by the system of FIG. 1 or 2, FIGS. 4 and 5 show, in front and rear views, an example of a structure to be imaged, and FIGS. 6A, 6B and 6C respectively illustrate an initial image of probabilities of defects, a reference noisy image and a corrected image of probabilities of defects, obtained by applying the method of FIG. 3 onto the structure of FIGS. 4 and 5.

The system 10' illustrated in FIG. 2 includes the same electronic control and processing circuit 20 as the system 10 of FIG. 1, but differs by the number and the location of the transducers. The imaging device 16' of the system 10' indeed includes a number N=9 of transducers 18', represented by black dots, distributed inside the zone 14' to be imaged, and this distribution can be regular without this being an obligation. The zone 14' is for example rectangular or square and the transducers 18' are for example distributed in a matrix. Such a matrix arrangement is generally qualified as an "imaging configuration", according to which the transducers 18' are scattered in the zone 14' to be imaged of the structure 12 while forming a plurality of elementary cells allowing to globally identify in which cell of transducers a defect is located.

The electronic control and processing circuit 20 has been presented as being a computer device with a processor executing a set of computer programs 26, 28, 32, 34, 36 stored in the memory 24A. These computer programs are themselves presented as distinct but this distinction is purely functional. They could just as well be grouped together according to all the possible combinations in one or more pieces of software. Their functions could also be at least partly microprogrammed or microwired in dedicated integrated circuits. Thus, alternatively, the electronic circuit 20 could be replaced by an electronic device composed only of digital circuits (without a computer program) for carrying out the same actions.

An imaging method that can be implemented by the device 16 or 16' of FIG. 1 or 2 will now be described in detail.

During a first step 102 of a first acquisition phase 100, the N transducers 18 or 18' are distributed over a surface of the structure 12, for example around the zone 14 or inside the zone 14' to be imaged. More generally, the first step 102 involves distributing N transmitters of mechanical waves intended to propagate in the structure 12 and P receivers of mechanical waves after their propagation in the structure 12. Also more generally and according to the intended use, the transmitters and receivers can be distributed over a plurality of surfaces of the structure 12 if it actually includes a plurality thereof, in particular on two opposite faces. This first step 102 is carried out when the structure 12 is considered without defects, in such a way as to obtain and record reference signals according to the methods defined above. Alternatively, if it is impossible to previously have available the structure 12 without defects, the step 102 can be carried out on a sample similar to that which the structure 12 should have been without defects, preferably identical or almost identical at all points to the structure 12 without defects, including in terms of instrumentation. The reference signals can thus likewise be obtained according to the methods defined above.

During a following step 104, the N transducers 18 or 18' are actuated sequentially by the central control unit 22, 30, in particular by execution of the programs 26 and 28, to obtain and record the Q first reference signals $S_{REF1}$ corresponding to the actuation of Q transmitter/receiver pairs out of the N×(N−1) possible different pairs, with or without repetitions of transmissions and receptions for each transmitter/receiver pair formed.

During a following step 106, which can represent a very significant duration with respect to the duration of execution of the steps 102 and 104, the structure 12 undergoes stresses such that one or more defects can appear in its inner volume or on the surface. This can for example occur during a step of manufacturing or of use involving the structure 12. Alternatively, if the structure 12 without defects is not previously available, this step 106 may not exist.

Finally, during a last step 108 of the acquisition phase 100, the N transducers 18 or 18' are again sequentially actuated, according to the same sequence as that of step 104, by the central control unit 22, 30, in particular by execution of the programs 26 and 28, but this time on the structure 12 with one or more possible defects, to obtain and record the Q signals S corresponding to the actuation of the aforementioned Q transmitter/receiver pairs, with or without repetitions of transmissions and receptions for each transmitter/receiver pair formed. For this step 108, it can be advantageous to respect as much as possible the same conditions of inspection, for example the same environmental conditions, as those of step 104, or at least to come close to them. But this is not an obligation. It has indeed been observed that even if the initial conditions of inspection (those of step 104) are significantly deviated from in step 108, an imaging method according to the invention remains capable of providing results usable in terms of detection and location of defects.

The acquisition phase 100 is followed by a processing phase 200 executed by the central processing unit 22, 38.

A prior step of simulation 202 involves artificially obtaining the Q second reference signals $S_{REF2}$ by addition of simulated random noise to the Q first reference signals $S_{REF1}$. The Q first reference signals $S_{REF1}$ at the same time consisting of continuous random measurement noise and of pulse or harmonic useful signals having a finite duration, it is very easy to extract therefrom certain statistical parameters of noise and of useful signal, in particular the average and the standard deviation. The simulated random noise added to the Q first reference signals $S_{REF1}$ to obtain the Q second reference signals $S_{REF2}$ thus has for example a zero average and a standard deviation optionally between that of the noise measurable in the Q first reference signals $S_{REF1}$ and that of the useful pulse signal also measurable in the Q first reference signals $S_{REF1}$. Preferably, the standard deviation of the simulated random noise is closer to that of the measured noise than to that of the useful pulse signal measured. It is even advantageously of the same order of magnitude as that of the measured noise. Alternatively, as touched upon above, it is possible to replace the simulation step 202 by two successive sequences of measurements in step 104, to obtain successively and by measurement the reference signals $S_{REF1}$ and $S_{REF2}$.

A first correlation step 204, carried out by execution of the computer program 32 on the signals S and $S_{REF1}$, allows to obtain the Q first values of correlations $V_1, \ldots, V_Q$.

A first construction step 206, carried out by execution of the computer program 34 on the Q first values of correlations $V_1, \ldots, V_Q$, allows to obtain the image $Im_{INIT}$ of probabilities of defects.

A second correlation step 208, carried out by execution of the computer program 32 on the signals $S_{REF1}$ and $S_{REF2}$, allows to obtain the Q second values of correlations $V'_1, \ldots, V'_Q$.

A second construction step 210, carried out by execution of the computer program 34 on the Q second value of correlations $V'_1, \ldots, V'_Q$, allows to obtain the reference noisy image $Im_{REF}$.

Finally, a last subtraction step 212, carried out by execution of the computer program 36 after the steps 202 to 210, allows to obtain the corrected image $Im_{CORR}$.

Figure 4:
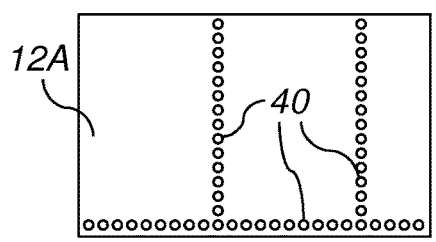

FIG. 4 illustrates in a front view 12A an example of a structure 12 to be imaged. This is for example a rectangular composite panel with rivet holes and stiffeners, in particular a portion of an airplane wing. The rivet holes 40 are visible in FIG. 4 and shown by small circles disposed according to two columns and a line on the lower border. The panel can itself be slightly curved, which is not visible in FIG. 4.

Figure 5:
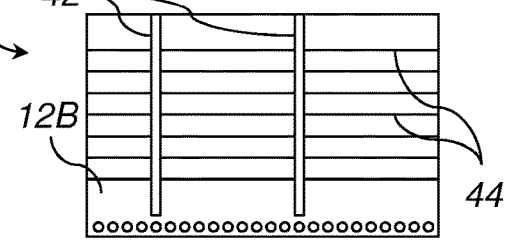

FIG. 5 illustrates the same composite panel 12 in a rear view 12B. The stiffeners are visible in this drawing: they include two vertical thick stiffeners 42 and seven horizontal thin stiffeners 44. The two thick stiffeners 42 cover the two columns of rivet holes up to near the lower line of rivet holes.

The structure 12 of FIGS. 4 and 5 is a good example of a complex thin structure, because the presence of the rivet holes 40 with an effect of diffraction and of the stiffeners 42, 44 greatly disturbs the propagation of the guided volume or surface mechanical waves in the structure 12. It is very difficult to model the exact propagation of the guided mechanical waves in this type of structure because of its complexity. The algorithms of the prior art known to provide very precise results under the condition that the geometry of the structure, or at least the propagation of the waves in the structure, is known a priori are consequently inapplicable for this type of complex structure or require a prohibitive simulation effort.

Figure 6A:
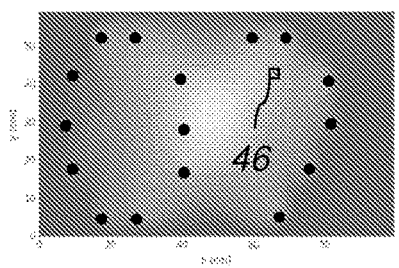
Figure 6B:
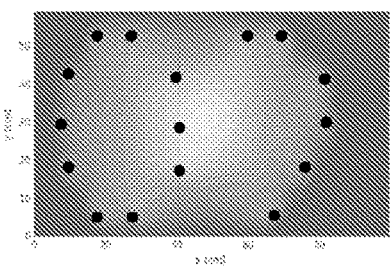
Figure 6C:
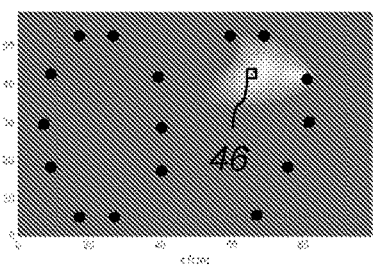

FIGS. 6A, 6B and 6C are images obtained in the reference frame of the front face 12A of the composite panel of FIGS. 4 and 5 by disposing sixteen transducers distributed according to the black points indicated in these FIGS. 6A, 6B and 6C. According to the reference frame indicated in these drawings, the composite panel has a width equal to approximately 100 cm and a height equal to approximately 60 cm. A defect 46 on the scale of a centimeter was artificially created for the needs of the experiment, for example using two small magnets disposed facing each other on the two sides of the structure 12: the advantage of this type of artificially created defect is that it removable while exerting observable mechanical stresses as the defect, in particular in terms of creation of reflected waves.

FIG. 6A is the image $Im_{INIT}$ of probabilities of defects obtained after step 206. It corresponds to that which can be obtained by directly applying the RAPID algorithm. The lighter the pixels, the more this means that the probability of the presence of a defect is high. On the contrary, the darker they are, the more this means that the probability of the presence of a defect is low. More precisely, the value of the pixels represents an arbitrary scale proportional to the probability of the presence of a defect, as detected by the method described in detail above up to step 206. It appears that FIG. 6A does not allow to locate and characterize the defect 46. It would even be of a nature to direct the observer towards a false detection in the central part of the image. This is caused by the bias introduced by the image-construction method chosen.

FIG. 6B is the reference noisy image $Im_{REF}$ obtained after step 210 from the measurements carried out on the structure 12 without the defect 46. It completely repeats the bias introduced by the image-construction method chosen, linked in particular to the geometry of the structure 12 and to the placement of the transducers 18. A non-zero probability of a presence of a defect in the central part of the image is again seen therein, even though this image was obtained from $S_{REF1}$ and $S_{REF2}$.

FIG. 6C is the corrected image $Im_{coRR}$ of probabilities of defects obtained after step 212. The bias introduced by the image-construction method chosen is almost completely eliminated therein by subtraction of the image $Im_{REF}$ from the image $Im_{INIT}$, which allows to reveal a lighter zone effectively centered around the defect 46. This lighter zone of detection of the defect 46 was not at all visible in FIG. 6A. Again, the scale of values of the pixels in FIG. 6C only provides relative information: the probability of a presence of a defect is much greater in the light zone than in the rest of the image.

It is clear that an imaging device such as one of those, 16 or 16', described above allows to eliminate the bias engendered by the method for image construction from the values of correlations calculated, this bias being strongly dependent on the positioning of the transducers, or more generally of the transmitters and receivers, and on the geometry of the structure inspected. This allows in the end to ensure a robust and much more reliable and precise detection of the defect(s), while considerably reducing the risk of false detections, all this in a context of algorithmic processing that remains particularly simple with respect to the other imaging methods requiring knowledge of the geometry and of the mechanical properties of the structure inspected.

Moreover, it is noted that the invention is not limited to the embodiments described above.

In particular the construction of intermediate images by elliptical zones could be adapted according to various possible shapes of zones around the transmitter/receiver pairs formed and according to various empirically possible parameterizations. In other words the implementation of the present invention is not limited to the context of the RAPID algorithm as taught in the aforementioned document by Zhao et al. or improved in the aforementioned document by Li et al.

It is more generally clear to a person skilled in the art that various modifications can be made to the embodiments described above, in light of the teaching that has just been disclosed thereto. In the following claims, the terms used must not be interpreted as limiting the claims to the embodiments disclosed in the present description, but must be interpreted to include all the equivalents that the claims aim to cover due to their formulation and the providing of which is within the reach of a person skilled in the art by applying the general knowledge of a person skilled in the art to the implementation of the teaching that has just been disclosed thereto.

The invention claimed is:

1. A device for imaging defects in a structure by transmitting and receiving mechanical waves in this structure, including:
    a plurality of N transmitters of mechanical waves intended to propagate in the structure, to be distributed over at least one surface of the structure,
    a plurality of P receivers of mechanical waves after their propagation in the structure, to be distributed over said at least one surface of the structure,
    a central unit for controlling the N transmitters and P receivers programmed to record Q≤N×P signals (S) obtained from electrical signals respectively provided by the receivers of Q different transmitter/receiver pairs of the plurality of transmitters and receivers, after reception of mechanical waves transmitted by the transmitters of said Q different pairs,
    means for storing Q corresponding first reference signals ($S_{REF1}$), representative of the structure without defects,
    a central unit for processing the Q signals (S) obtained, programmed to correlate each signal (S) obtained with the first reference signal ($S_{REF1}$) that corresponds to it, in such a way as to obtain Q first values of correlations, and to construct an image ($Im_{INIT}$) of probabilities of defects in the structure from the Q first values of correlations,
further includes means for storing Q corresponding second reference signals ($S_{REF2}$), also representative of the structure without defects but differing from the Q first reference signals ($S_{REF1}$) by random noise, and in that the central unit for processing the Q signals (S) obtained is further programmed to:
    correlate each first reference signal ($S_{REF1}$) with the second reference signal ($S_{REF2}$) that corresponds to it, in such a way as to obtain Q second values of correlations,
    construct a reference noisy image ($Im_{REF}$) from the Q second values of correlations, and
    subtract the reference noisy image ($Im_{REF}$) from the image ($Im_{INIT}$) of probabilities of defects.

2. The imaging device according to claim 1, wherein at least a part of the N transmitters is part of the P receivers.

3. The imaging device according to claim 1, wherein each of the N transmitters and of the P receivers is an actuator or a sensor chosen from the set consisting of:
    a piezoelectric transducer,
    an electromagnetic acoustic transducer,
    a microelectromechanical or nanoelectromechanical transducer, a fiber-optic sensor, and a laser sensor.

4. The imaging device according to claim 1, wherein each of the N transmitters and of the P receivers is capable of transmitting or receiving guided waves in the structure, in particular Lamb or Rayleigh waves.

5. The imaging device according to claim 1, wherein the Q second reference signals ($S_{REF2}$) differ from the Q first reference signals ($S_{REF1}$) by random noise, simulated or measured, the standard deviation of which is between that of a noise measurable in the Q first reference signals ($S_{REF1}$) and that of a useful pulse or harmonic signal also measurable in the Q first reference signals ($S_{REF1}$), preferably closer to that of the measurable noise than to that of the measurable useful pulse signal.

6. The imaging device according to claim 1, wherein $Q=N \times P$, or $N=P$ and $Q=N \times (N-1)$.

7. The imaging device according to claim 1, wherein the construction of the image ($Im_{INIT}$) of probabilities of defects and the construction of the reference noisy image ($Im_{REF}$) each include the construction of Q intermediate images, each intermediate image corresponding to one of the Q different transmitter/receiver pairs and taking into account the corresponding first or second correlation value in a predetermined zone, in particular an elliptical zone, defined around the segment formed between the transmitter and the receiver of this pair.

8. A system for imaging defects in a structure by transmitting and receiving mechanical waves in this structure, including:

the structure wherein a zone to be imaged is located, an imaging device according to claim 1, wherein the N transmitters and P receivers are disposed circularly around the zone to be imaged for a construction of the image ($Im_{INIT}$) of probabilities of defects corresponding to this zone.

9. A system for imaging defects in a structure by transmitting and receiving mechanical waves in this structure, including:

the structure wherein a zone to be imaged is located, an imaging device according to claim 1, wherein the N transmitters and P receivers are distributed inside the zone to be imaged for a construction of the image ($Im_{INIT}$) of probabilities of defects corresponding to this zone.

10. A method for imaging defects in a structure by transmitting and receiving mechanical waves in this structure, including the following steps:

distributing, over at least one surface of the structure, a plurality of N transmitters of mechanical waves intended to propagate in the structure, distributing, over said at least one surface of the structure, a plurality of P receivers of mechanical waves after their propagation in the structure, controlling the N transmitters and P receivers to sequentially transmit and receive mechanical waves by the transmitters and receivers of $Q \leq N \times P$ different transmitter/receiver pairs of the plurality of transmitters and receivers, recording Q signals (S) obtained from electrical signals respectively provided by the receivers of the Q different pairs, after reception of said mechanical waves, processing the Q signals (S) obtained by respectively correlating them with Q corresponding first reference signals ($S_{REF1}$), representative of the structure without defects, in such a way as to obtain Q first values of correlations, constructing an image ($Im_{INIT}$) of probabilities of defects in the structure from the Q first values of correlations, further includes the following steps:

respectively correlating the Q first reference signals ($S_{REF1}$) with Q corresponding second reference signals ($S_{REF2}$), also representative of the structure without defects but differing from the Q first reference signals ($S_{REF1}$) by random noise, in such a way as to obtain Q second values of correlations, constructing a reference noisy image ($Im_{REF}$) from the Q second values of correlations, and subtracting the reference noisy image ($Im_{REF}$) from the image ($Im_{INIT}$) of probabilities of defects.

* * * * *